United States Patent
Pinto et al.

(10) Patent No.: US 7,051,415 B2
(45) Date of Patent: May 30, 2006

(54) NET RUCKING APPARATUS AND METHOD

(75) Inventors: Robert Pinto, Chicago, IL (US); Eggo Haschke, Deerfield, IL (US)

(73) Assignee: Poly-Clip System Corp., Mundelein, IL (US)

( * ) Notice: Subject to any disclaimer, the term of this patent is extended or adjusted under 35 U.S.C. 154(b) by 304 days.

(21) Appl. No.: 10/675,440

(22) Filed: Sep. 30, 2003

(65) Prior Publication Data

US 2005/0066508 A1    Mar. 31, 2005

(51) Int. Cl.
*B23P 19/04* (2006.01)
*A22C 13/02* (2006.01)

(52) U.S. Cl. .................. 29/455.1; 29/235; 53/576; 452/24; 452/21; 452/33; 138/118.1

(58) Field of Classification Search ........... 29/235, 29/450, 455.1; 425/21, 23, 24, 33; 138/118.1, 138/118; 53/576
See application file for complete search history.

(56) References Cited

U.S. PATENT DOCUMENTS

| | | | |
|---|---|---|---|
| 1,761,189 A * | 6/1930 | Brennan et al. | 452/24 |
| 3,315,300 A * | 4/1967 | Ziolko | 452/24 |
| 3,454,981 A * | 7/1969 | Martinek | 452/24 |
| 3,703,065 A | 11/1972 | Soodalter | |
| 3,745,611 A * | 7/1973 | Patouillard | 452/23 |
| 4,624,029 A * | 11/1986 | Tomczak et al. | 452/24 |
| 4,627,130 A * | 12/1986 | Nausedas et al. | 452/33 |
| 4,683,615 A * | 8/1987 | Tomczak et al. | 452/24 |
| 4,768,261 A * | 9/1988 | Nakamura | 452/33 |
| 4,773,127 A * | 9/1988 | Stall | 452/24 |
| 4,910,034 A | 3/1990 | Winkler | |
| 4,924,552 A | 5/1990 | Sullivan | |
| 4,958,477 A | 9/1990 | Winkler | |
| 5,024,041 A | 6/1991 | Urban et al. | |
| 5,056,293 A * | 10/1991 | Richards et al. | 53/116 |
| 5,273,481 A | 12/1993 | Sullivan | |
| 5,352,151 A * | 10/1994 | Piereder | 452/32 |
| 6,263,643 B1 | 7/2001 | Kovacs et al. | |
| 6,883,297 B1 * | 4/2005 | Kirk et al. | 53/502 |

FOREIGN PATENT DOCUMENTS

| | | |
|---|---|---|
| CA | 2 440 824 A1 | 3/2002 |
| DE | 3814173 A1 | 11/1988 |
| EP | 1 078 574 A1 | 2/2001 |
| WO | WO 90/00861 * | 2/1990 |
| WO | WO02/074094 A1 | 9/2002 |
| WO | WO2004/075638 A1 | 9/2004 |

* cited by examiner

*Primary Examiner*—Essama Omgba
(74) *Attorney, Agent, or Firm*—Trexler, Bushnell, Giangiorgi, Blackstone & Marr, Ltd.

(57) ABSTRACT

An apparatus and method for shirring netting onto a netting tube. A second tube is placed over and coaxially to the netting tube and netting is stretched over the second tube. The two tubes are caused to move in a reciprocating manner through a plurality of spring-loaded fingers, which allow the netting to pass on the downstroke and hold the netting on the upstroke. As the two tubes move, the netting is pulled over the second tube and shirred onto the netting tube. An annular space formed by a tube ring placed between the netting tube and the second tube causes the netting to shir in multiple, neatly aligned layers.

14 Claims, 8 Drawing Sheets

NET RUCKING APPARATUS AND METHOD

BACKGROUND OF THE INVENTION

This invention relates to the field of preparing food products in shirred, tubular casings and enclosing the products in a netting. One method generally used in the industry is to pump food products, such as sausage meat, whole muscle meats, or otherwise, through a product horn. The meat products are forced into an edible film and then into netting. The food products to be packaged will expand and push the film through the netting. After processing, such as smoking or cooking, the netting will be removed, leaving a dimpled appearance on the food products that is considered pleasing to consumers. The edible casing will prevent the netting from sticking to the meat, so upon removal of the netting a clean appearance of the meat is maintained. (There is no reason why the invention is limited to meat; it can be used for cheese or vegetarian sausage or anything else for which a dimpled appearance is desired.) This method is illustrated in U.S. Pat. No. 4,910,034 and its divisional, U.S. Pat. No. 4,958,477. As can be seen from FIG. 4 of those two patents, there are three coaxial tubes. The sausage meat or other ingredient is pumped into the smallest diameter tube; the middle tube forms the edible casing into a tube; and the outer tube (the "netting tube") holds the netting.

The netting used in this process arrives from the manufacturers in a flattened state and wrapped circumferentially on a disposable cylinder. In order to be used as described above, the netting has to be shirred onto a temporary netting tube. This shirring process, or "rucking", involves placing the netting coaxially onto the netting tube. There is an advantage to being able to maximize the amount of netting placed on the netting tube, in that minimizing downtime to change netting tubes causes disruptions and inefficiencies in the process. Once the netting has been shirred onto the netting tube, the tube is place on a sausage making machine for extrusion of sausage, as described in U.S. Pat. Nos. 4,910,034 and 4,958,477 and as illustrated in, for example, FIG. 7 of those patents.

In the prior art, a netting tube is caused to reciprocate vertically, such as by use of an air cylinder. The netting is stretched over the tube. A plurality of spring-loaded fingers secured to a bracket surround the netting tube circumferentially. These fingers are normally in a horizontal position. Downward force moves them down; the springs cause them to snap back to the normal horizontal position when the force is removed. Accordingly, the fingers carry the netting downward during the upward stroke of the tube, and slide over the netting during the downward stroke of the tube. The reciprocating motion of the netting tube therefore causes the netting to be shirred onto the netting tube. This prior art is described in, for example, U.S. Pat. No. 5,273,481. Note that only one layer of netting is shirred onto the netting tube by this method.

A prior art improvement is to add a second tube, which fits coaxially over the netting tube. The netting is stretched over the second tube. As the netting is carried over the second tube, the second tube rises in relation to the netting tube and the netting is shirred onto the netting tube, in the space between the base of the netting tube and the now-rising second tube. More netting can be shirred onto the netting tube in this manner, as compared to the prior art method of the previous paragraph, because multiple layers can be shirred, thereby rucking more linear feet of netting per length of netting tube. However, the netting is not shirred particularly neatly by this method. It bunches up and is wavy. The generally unkempt appearance of the netting on the tube is displeasing to prospective purchasers of the equipment. Additionally, and more importantly, the lack of neatness, caused as it is by a lack of uniformity, prevents shirring as much netting onto the tube as may be hoped for.

This prior art improvement used a second tube with a larger inside diameter than the outside diameter of the netting tube. Accordingly, a tube cap is inserted into the top of the second tube, to keep the second tube moving coaxially to the netting tube, and to allow the netting to slide smoothly over the second tube. A coaxial ring in the bottom of the second tube keeps the second tube coaxial to the netting tube, and will push the netting downward on the netting tube.

Although this prior art improvement increases the amount of netting that can be rucked onto a netting tube, further increases in this amount are desirable to users of the apparatus. Additionally, newly-developed devices attach to the output end of the netting tube during sausage making and allow the netting to slide off the netting tube in discrete, predetermined lengths. These newly-developed net deruckers require a clear space on the end of the netting tube, a space greater than the length of sausages to be made, further limiting the amount of netting that can be rucked onto the netting tube. Accordingly, the use of a net derucker further increases the need for maximizing the amount of netting that can be rucked onto a netting tube of given length. (Please note that more netting can be rucked onto a netting tube simply by increasing the size of the netting tube, but this option is not available or, at best, is impractical, for users with limited space.)

Accordingly, it is an object of the present invention to increase the amount of netting that can be rucked onto a netting tube. It is a further object of the present invention allow more netting to be rucked onto the netting tube and leaving a large length of netting tube without rucked netting, to allow for the use of a net derucker. It is a further object of the present invention to cause the netting to ruck neatly onto the netting tube.

BRIEF SUMMARY OF THE INVENTION

The present invention is an improvement to the prior art comprising placing a coaxial ring between the netting tube and the second tube, a distance from the bottom end of the second tube, creating an annular space defined by the netting tube, the ring, and the second tube. The netting curls underneath the second tube and fills this annular space first. On the next stroke, netting is shirred over the netting that had been shirred into this annular space. This method causes the netting to be shirred neatly, in multiple layers, without waviness, and allows more netting to be shirred onto a given length of netting tube.

DETAILED DESCRIPTION OF THE INVENTION

Figure 1:
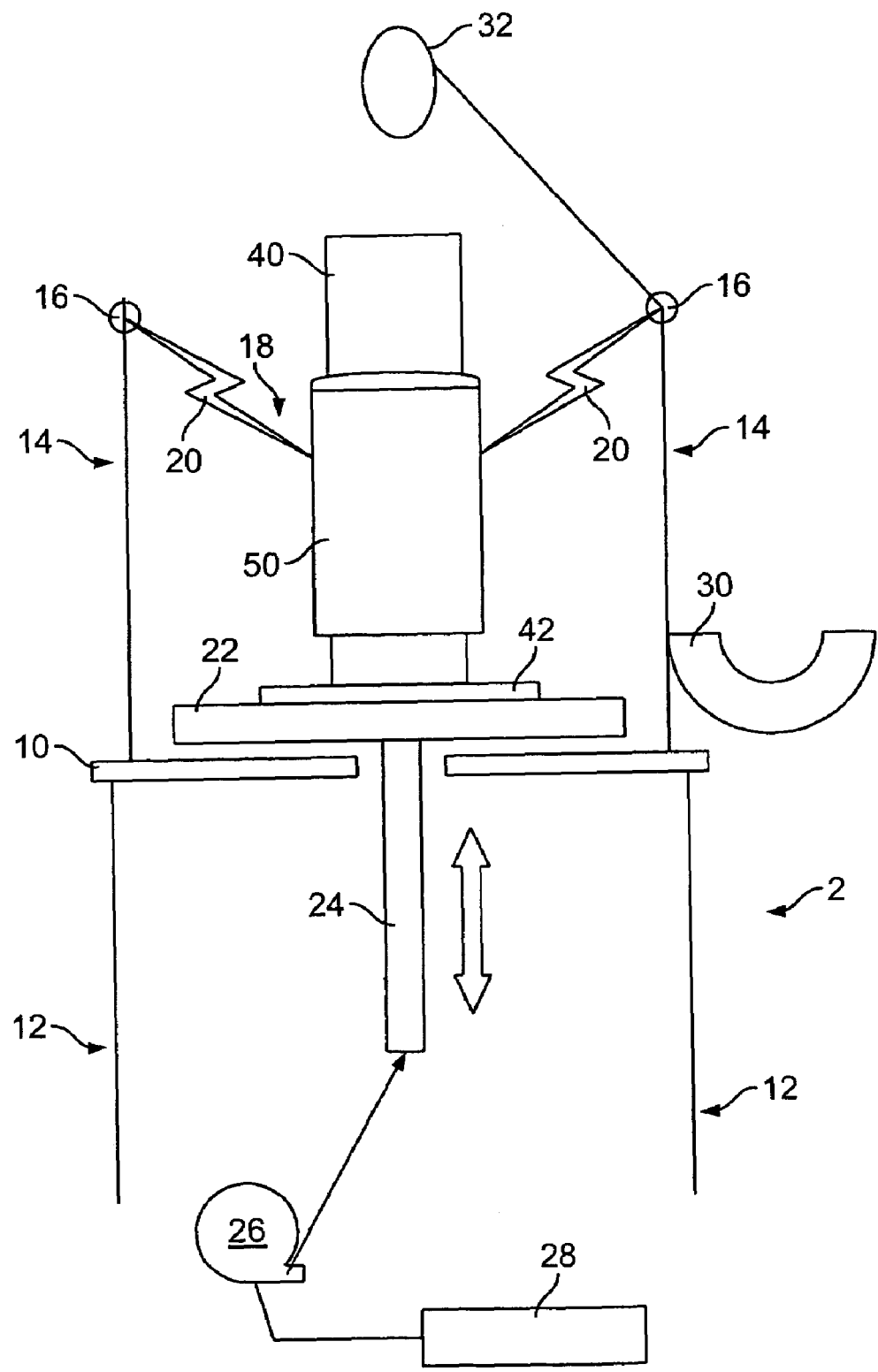
FIG. 1 is an elevational view of the apparatus of the present invention, without any netting in place.
Figure 1A:
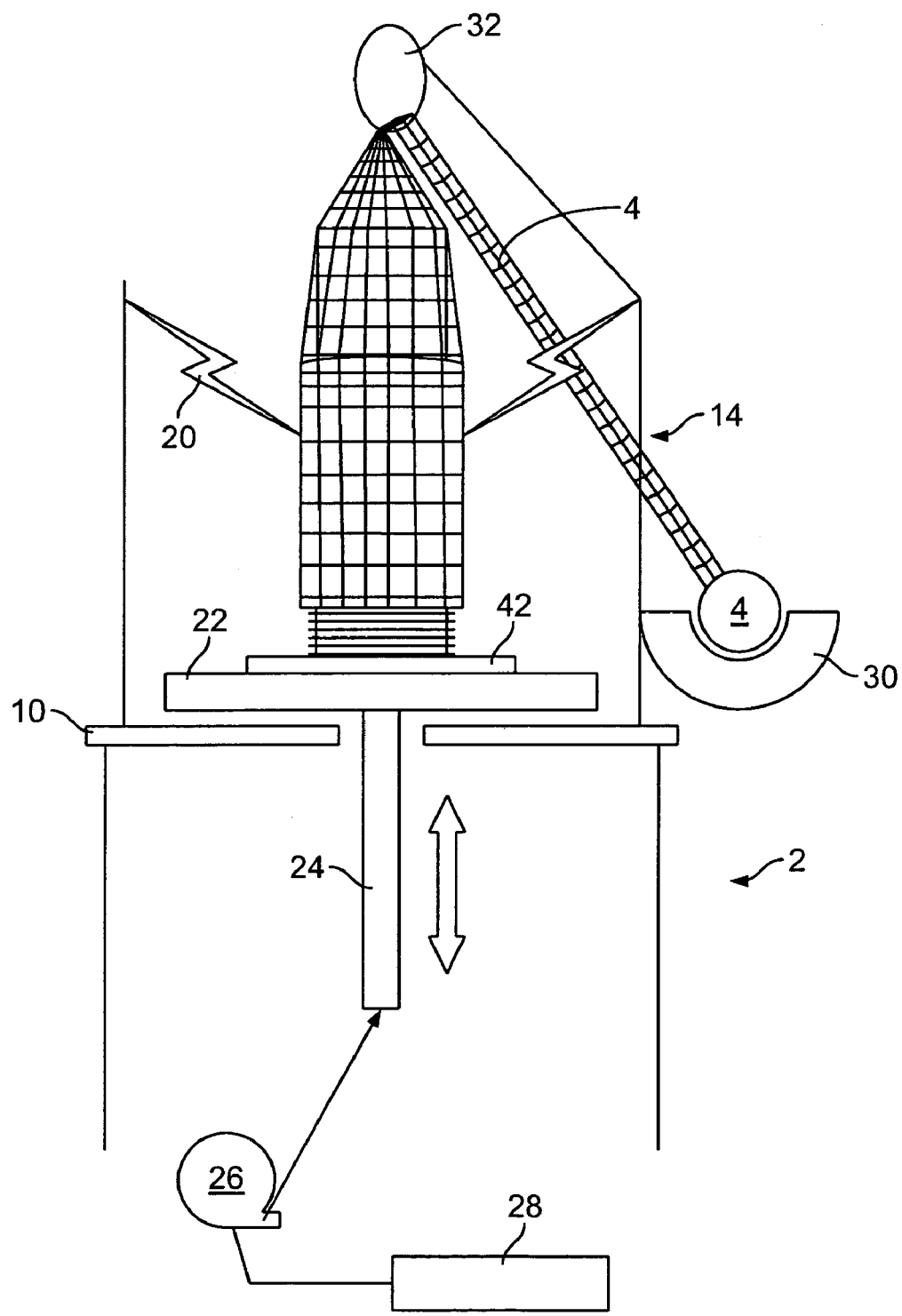
FIG. 1A is the same elevational view as FIG. 1, with the netting shown.

The organization and manner of the preferred embodiments of the invention, together with further objects and advantages thereof, may best be understood by reference to the following description of the preferred embodiment of the invention, taken in connection with the following drawings:

The preferred embodiment of the net rucking apparatus 2, is shown in elevation view in FIG. 1 without the netting 4 present, and in FIG. 1A with the netting 4 present. The apparatus 2 comprises a frame 10, a netting tube 40, and a second tube 50. The frame 10 has legs 12 to support it, and upper arms 14 that hold a net rucker head 16. The net rucker head 16 defines a passage 18 through which the netting tube 40 and second tube 50 pass. Attached to the net rucker head 16 and extending into the passage 18 are a plurality of spring-loaded fingers 20.

A moveable platform 22 sits on top of the frame 10. It is configured to travel in an upward and downward direction, powered by lifting means. In the preferred embodiment, the lifting means comprise an air-actuated cylinder 24, connected to an air supply 26 which is controlled by a control means 28. Any lifting means that can provide reciprocating axial action will suffice, such as a gear arrangement, another type of hydraulic cylinder, or a treadle. In the preferred embodiment, the control means 28 is a microprocessor with an application specific program written to it, but any suitable controller, digital or analog, will suffice.

Netting 4 is placed in a net tray 30 that is attached to an upper arm 14. The leading edge of the netting 4 travels up to a net guide 32, attached to and above one of the upper arms 14 and above the net rucker head 16. The net guide 32 leads the netting 4 down through the passage 18 as will hereinafter be described.

Figure 2:
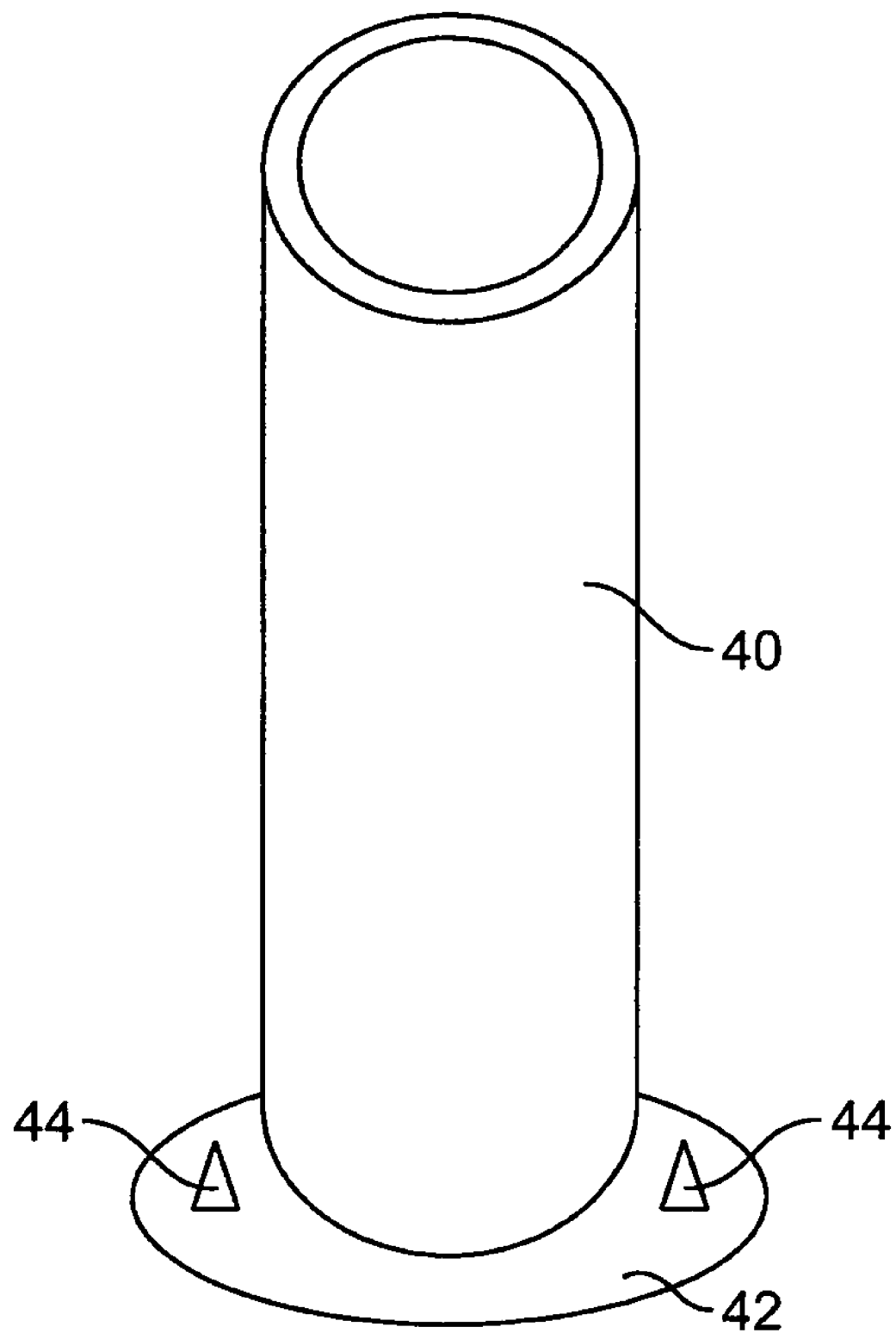
FIG. 2 is a perspective view of the netting tube.

The netting tube 40, shown enlarged in FIG. 2, is a hollow cylinder with a base plate 42. In the preferred embodiment, the netting tube 40 is stainless steel, for use in a food-processing environment. There are attachment means 44 on the baseplate, to hold the netting tube 40 securely to the moveable platform 22. The attachment means 44 are preferably identical to the means by which the netting tube will be attached to a sausage-making machine after rucking of the netting 4. The attachment means 44 can be a simple nut-and-bolt arrangement, a locking clamp, or any system to hold the netting tube 40 firmly to the moveable platform 22.

Figure 3:
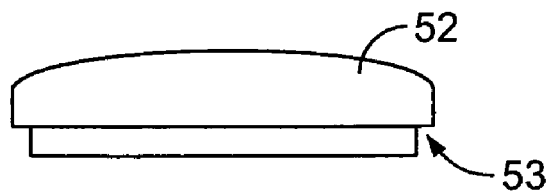
FIG. 3 is an elevational view of the tube cap ring.
Figure 4:
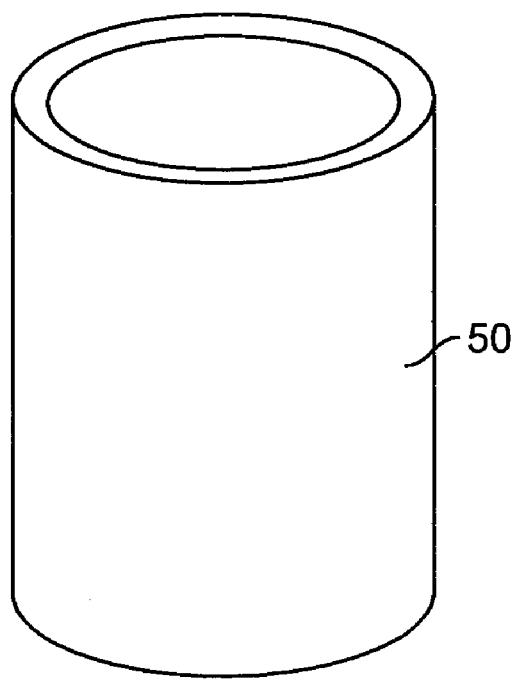
FIG. 4 is a perspective view of the preferred embodiment of the second tube.

The second tube 50, shown in perspective view in FIG. 4, is also a hollow cylinder, with an inside diameter greater than the outside diameter of the netting tube 40. The second tube 50 is preferably made of a heavy plastic, to allow netting 4 to slide over it easily. At the top of the second tube 50 is placed a tube cap ring 52, shown in elevational view in FIG. 3. The tube cap ring 52 is a toroidal element with a notched edge 53, so that it has one outer diameter equal to the outer diameter of the second tube 50, and a second outer diameter equal to the inner diameter of the second tube 50, allowing the tube cap ring 52 to snap onto the top end of the second tube 50. The tube cap ring 52 has an inner diameter just slightly larger than the outer diameter of the netting tube 40, so that the tube cap ring 52 can slide easily axially to the netting tube 40. The tube cap ring 52 is rounded or at least angled on the side opposite the notched edge, to allow netting 4 to slide over it easily, as the purpose of the tube cap ring 52 is to prevent snagging. In the preferred embodiment, the tube cap ring 52 stays firmly attached to the second tube 50 by an interference fit, but glue could also be used if necessary.

Figure 5:
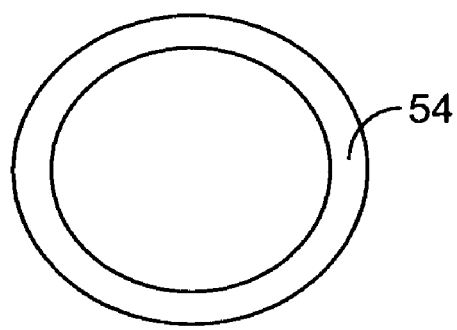
FIG. 5 is a plan view of the lower tube ring.
Figure 6:
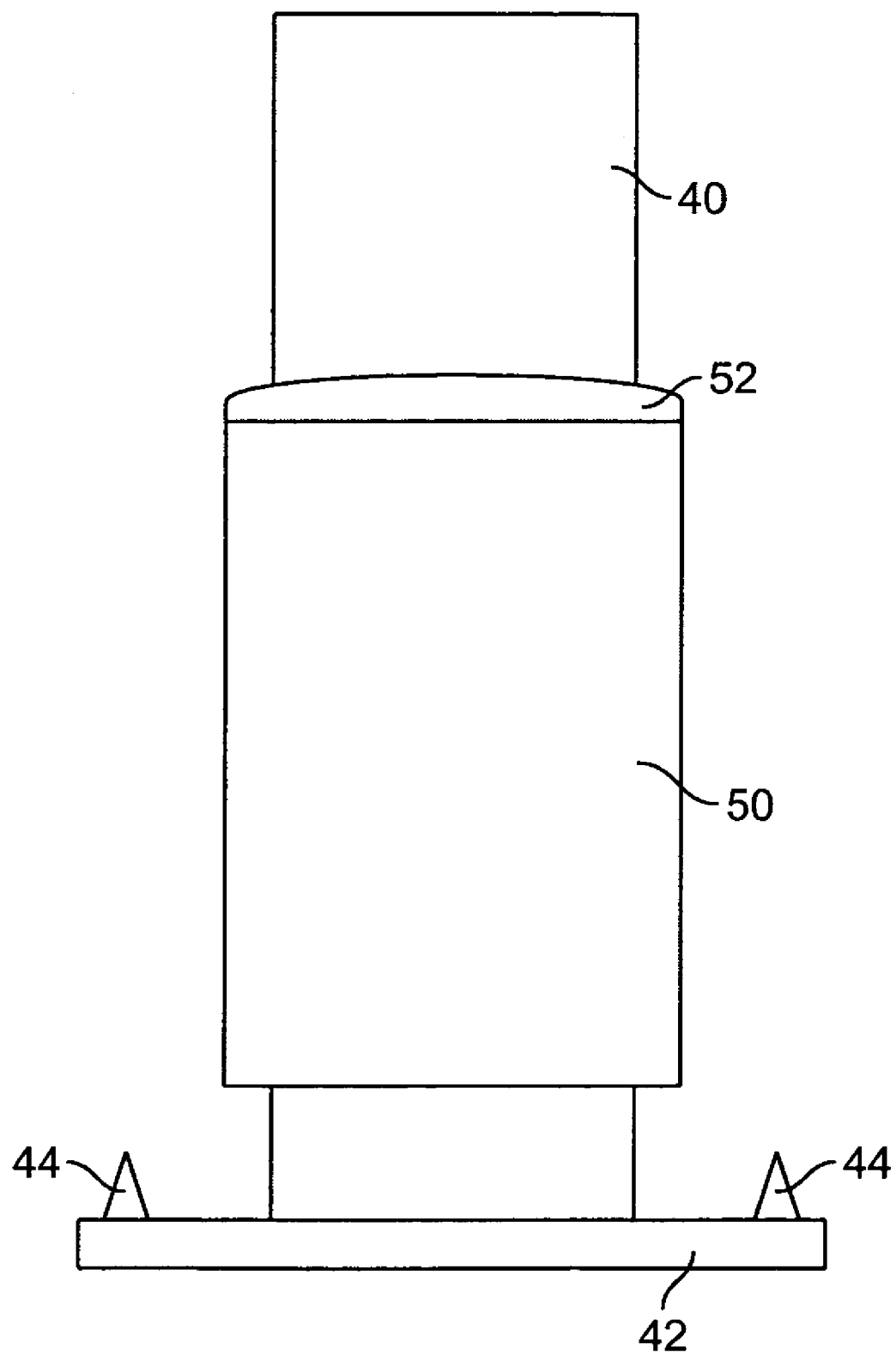
FIG. 6 is an elevational view of the preferred embodiment of the second tube placed over the netting tube.
Figure 7:
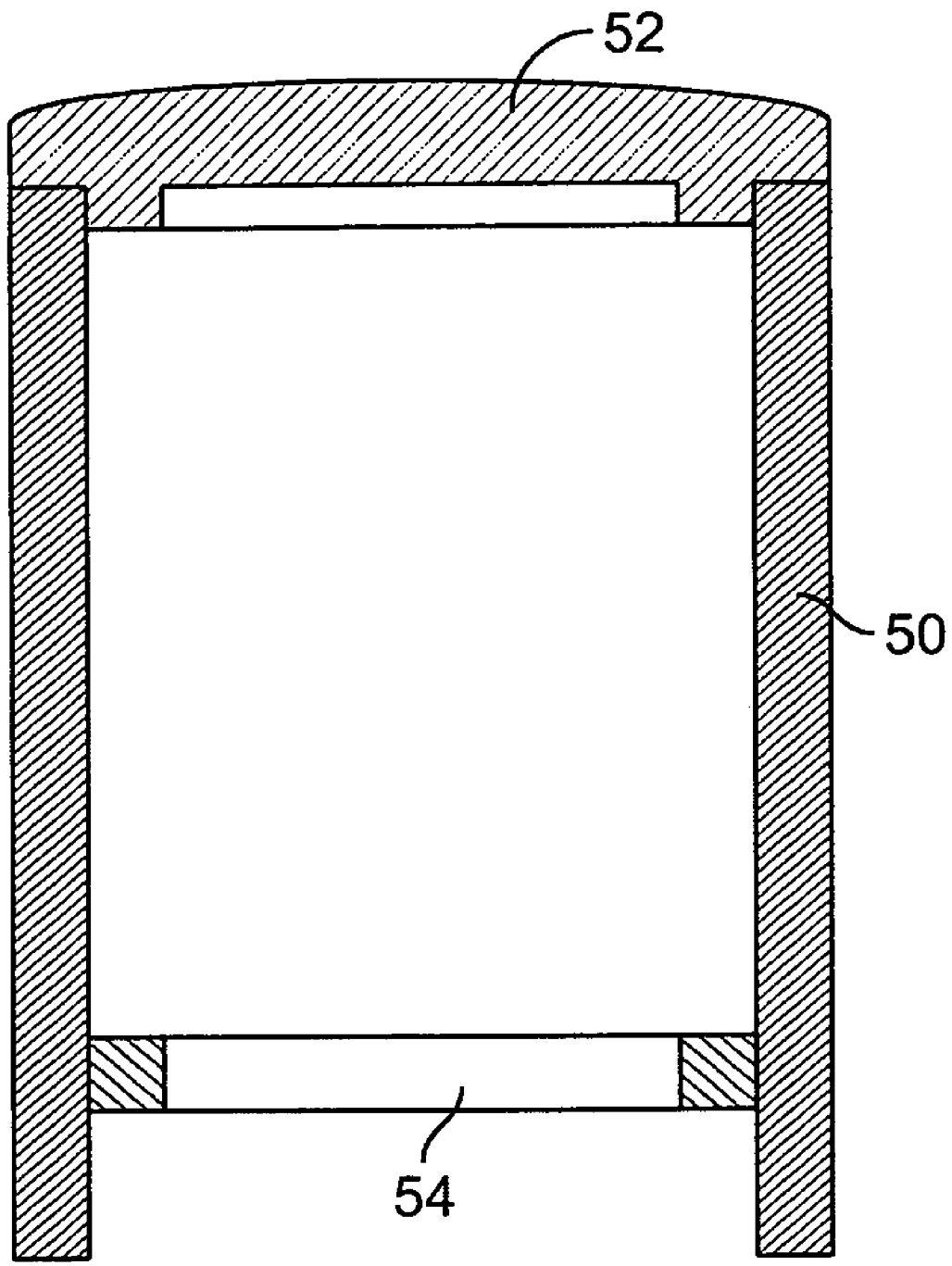
FIG. 7 is a partial cutaway elevational view of the preferred embodiment of the second tube.
Figure 8:
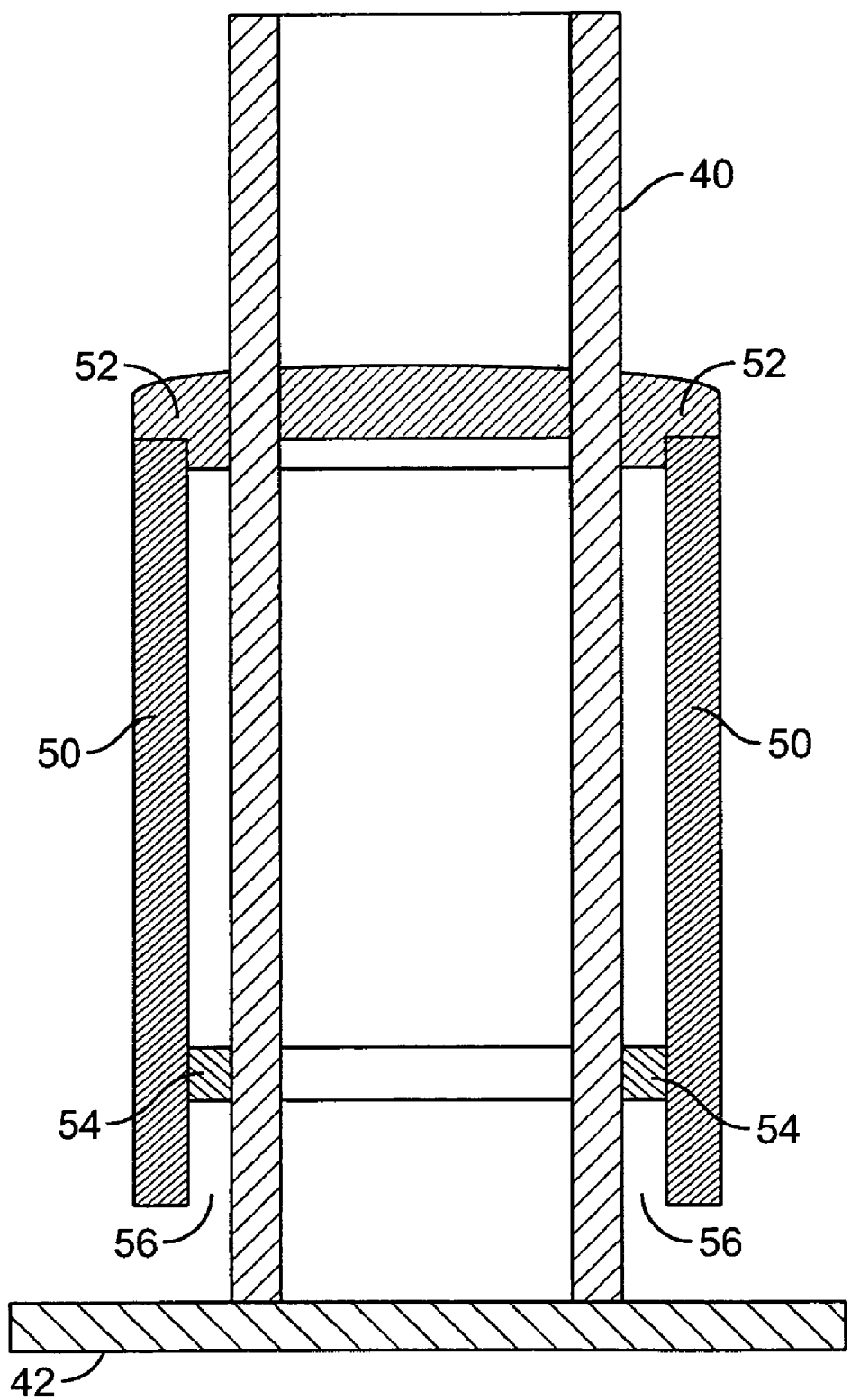
FIG. 8 is a partial cutaway elevational view of the preferred embodiment of the second tube placed over the netting tube.

A lower tube ring 54, shown in plan view in FIG. 5, is also of a toroidal shape and is placed inside and coaxially to the second tube 50. The lower tube ring 54 has an outer diameter equal to the inner diameter of the second tube 50 and forming an interference fit, so that the lower tube ring 54 stays firmly situated inside the second tube 50. The inner diameter of the lower tub ring 54 is, like the tube cap ring 52, just slightly larger than the outer diameter of the netting tube 40, so that the lower tube ring 54 can easily slide axially to the netting tube 40, as shown in elevation view in FIG. 6. The lower tube ring 54 is placed inside the second tube 50, a short distance, preferably an inch, from the bottom of the second tube, as shown in partial cutaway view in FIG. 7. Because the lower tube ring 54 is placed a short distance from the bottom end of the second tube 50, an annular space 56 is defined by the netting tube 40, lower tube ring 54, and the second tube 50. When the tube cap ring 52 and the lower tube ring 54 are put in place on the second tube 50, as shown in elevation view on FIG. 6, the tube cap ring 52 and the lower tube ring 54 slide easily along the netting tube 40, so that the second tube 50 travels coaxially to the netting tube 40. In an alternative embodiment, extra lower tube rings 54 can be placed inside the second tube 50. Only the lower tube ring 54 that defines the annular space 56 is necessary for this present invention, however.

Figure 9:
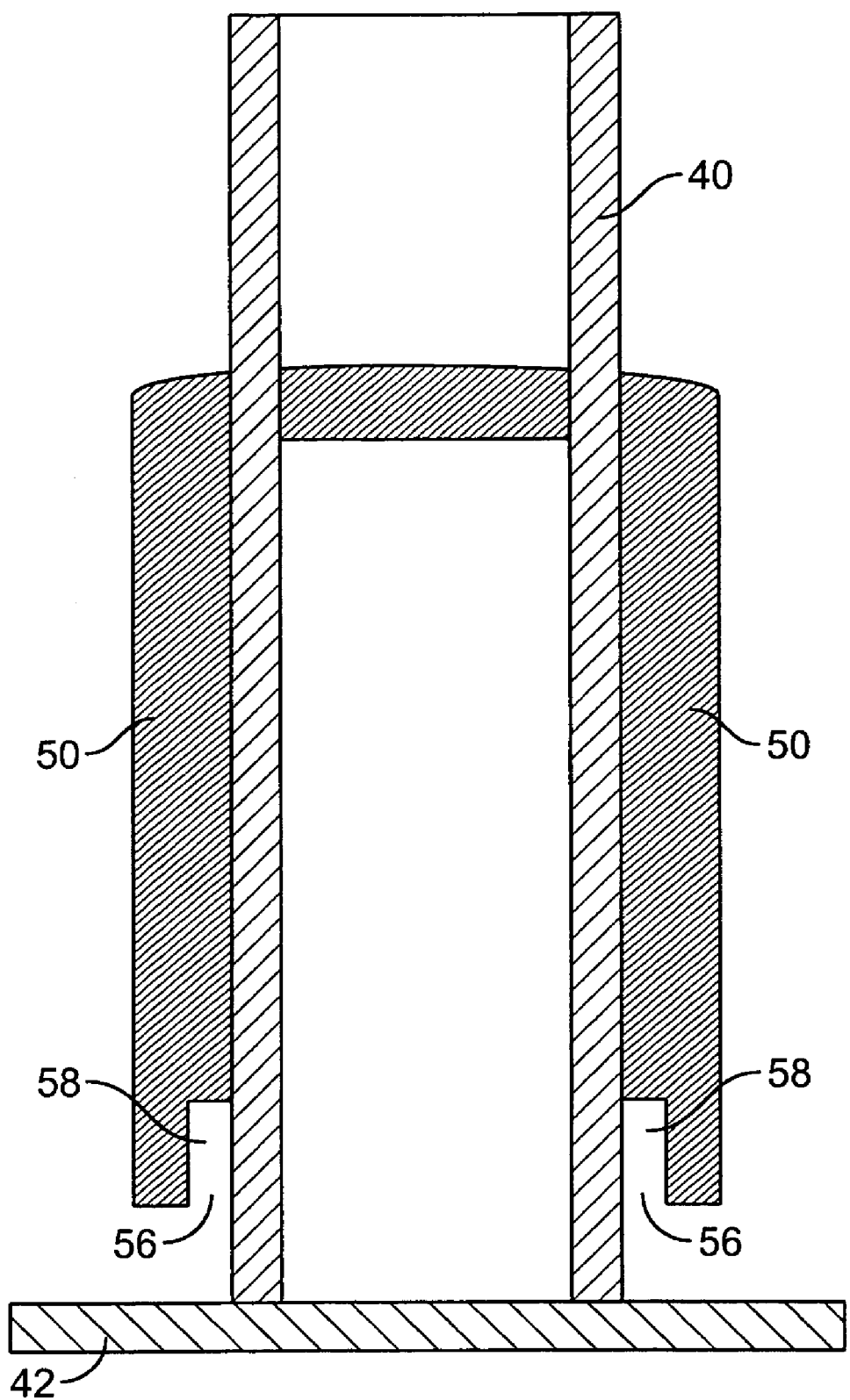
FIG. 9 is a partial cutaway elevational view of another embodiment of the second tube placed over the netting tube.

In another embodiment, the second tube 50 has an inner diameter just slightly greater than the outer diameter of the netting tube 40, as shown in FIG. 9. Instead of placing a lower tube ring 54 in the bore of the second tube 50, however, a notch 58 is cut out of the lower end of the second tube 50, thereby forming the annular space 56.

For use, the netting tube 40 is placed on the moveable platform 22 and attached by the attachment means 44. The second tube 50, with its two rings 52, 54 in place, is placed over the netting tube 40. The moveable platform 22, by its reciprocating motion, causes the netting tube 40, surrounded by the second tube 50, to travel in a reciprocating, coaxial movement through the passage 18.

The spring-loaded fingers 20 are arranged so that they conform to the diameter of the second tube 50 and the netting tube 40. During downward travel of the second tube 50 and the netting tube 40, the fingers 20 are pushed away circumferentially from the two tubes 40 and 50, allowing netting 4 to travel in a downward direction. When the second tube 50 and netting tube 40 travel upward, the spring-loaded fingers 20 snap back to engage the netting and prevent it from traveling.

Accordingly, in use the netting 4 is placed in the net tray 30 and the free end is run through the net guide 32 and over the second tube 50, to at least a point below the reciprocating fingers 20. As the moveable platform 22 moves down, it pulls netting 4 down with it, past the spring-loaded fingers 20. When the reciprocating platform 22 reaches the bottom of its downstroke, the cylinder 24 reverses movement to an upward direction, pushing the netting tube 40 and second tube 50 through the passage 18. The spring-loaded fingers 20 now engage the netting 4 on the second tube 50 and prevent it from traveling. The second tube 50 nevertheless continues in an upward path, as the netting 4 can slide over the smooth plastic surface of the second tube 50, so the netting 4 moves downward relative to the second tube 50. Thus, as the moveable platform 22 reverses again in its reciprocating motion, the netting 4 is pulled down toward the bottom of the second tube 50. When the netting gets to the bottom of the second tube 50, the spring-loaded fingers 20 push it off the second tube 50 and the netting 4 contracts around the smaller-diameter netting tube 40. Accordingly, the second tube 50 is forced slightly upward, relative to the netting tube 40, by the spring-loaded fingers 20, as netting 4 is rucked onto the bottom of the netting tube 40. On each upward stroke of the moveable platform 22, more netting 4 is pushed by the spring-loaded fingers 20 off the second tube 50 and onto the netting tube 40. The spring-loaded fingers 20 push the netting 4 inward, causing it to fill the annular space 56. Because of the annular space 56, the netting 4 is rucked neatly and several layers thick. Accordingly, the apparatus 2 will ruck approximately four to five times as much netting 4 onto a given size of netting tube 40 as a conventional rucker without this annular space.

While preferred embodiments of the present invention are shown and described, it is envisioned that those skilled in the art may device modifications of the present invention without departing from the spirit and scope of the appended claims.

We claim:

1. A method of rucking netting onto a netting tube, comprising:
    attaching a netting tube to a moveable platform,
    placing a second tube axially over said netting tube,
    placing an end of a netting over said second tube,
    placing a tube ring inside of and concentric to said second tube a distance from the bottom end of the second tube, a distance from the bottom end of the second tube, the tube ring snuggly fitting inside the second tube, whereby said tube ring said second tube and said netting tube form an annular space, and
    moving said second tube reciprocatingly through spring-loaded fingers.

2. The method of claim 1, further comprising preventing snagging of said netting.

3. An apparatus for rucking netting onto a tube, comprising:
    a frame having an axis,
    means for reciprocating movement along said axis,
    a netting tube having an outside diameter and an axis and releasably attachable to said means for reciprocating movement,
    a second tube having a bore with a first diameter slightly greater than said netting tube outside diameter and demountably alignable co-axially to said netting tube,
    a notch in an end of said second tube forming an annular space with said netting tube, and spring-loaded fingers attached to said frame and extending circumferentially into said axis of said frame, forming a passage through which said netting tube and said second tube move when said netting tube is attached to said platform and said second tube is mounted on said netting tube.

4. The apparatus of claim 3, further comprising means to prevent snagging to a netting on said second tube.

5. The apparatus of claim 3, further comprising a tube cap attached to said second tube and having a tapered surface.

6. The apparatus of claim 3, further comprising means to control said means for reciprocating movement.

7. The apparatus of claim 3, whereby said means for reciprocating movement comprises an air-actuated cylinder and an air supply.

8. The apparatus of claim 7, further comprising means to control said air-actuated cylinder.

9. An apparatus for rucking netting onto a tube, comprising:
    a frame having an axis,
    a platform attached to means for reciprocating movement along said axis,
    a netting tube having an outside diameter and an axis and releasably attachable to said platform,
    a second tube having a bore with a diameter greater than said netting tube outside diameter and demountably alignable co-axially to said netting tube,
    a tube ring aligned concentric to said bore of said second tube and sliding axially over said netting tube, whereby said tube ring, said second tube, and said netting tube form an annular space, and
    spring-loaded fingers attached to said frame and extending circumferentially into said axis of said frame, forming a passage through which said netting tube and said second tube move when said netting tube is attached to said platform and said second tube is mounted on said netting tube.

10. The apparatus of claim 9, further comprising means to prevent snagging to said netting on said second tube.

11. The apparatus of claim 10, whereby said means to prevent snagging comprises a tube cap attached to said second tube and having a tapered surface.

12. The apparatus of claim 9, further comprising means to control said means for reciprocating.

13. The apparatus of claim 9, whereby said means for reciprocating movement comprises an air-actuated cylinder and an air supply.

14. The apparatus of claim 13, further comprising means to control said air-actuated cylinder.

* * * * *

UNITED STATES PATENT AND TRADEMARK OFFICE
CERTIFICATE OF CORRECTION

| | |
|---|---|
| PATENT NO. | : 7,051,415 B2 |
| APPLICATION NO. | : 10/675440 |
| DATED | : May 30, 2006 |
| INVENTOR(S) | : Robert Pinto and Eggo Haschke |

It is certified that error appears in the above-identified patent and that said Letters Patent is hereby corrected as shown below:

Column 6, Line 26 "diameter greater" should be
-- diameter slightly greater --

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,051,415 B2  Page 1 of 1
APPLICATION NO. : 10/675440
DATED : May 30, 2006
INVENTOR(S) : Robert Pinto and Eggo Haschke It is certified that error appears in the above-identified patent and that said Letters Patent is hereby corrected as shown below:

Column 5, Line 36 please delete "a distance from the bottom end of the second tube,"

Signed and Sealed this

Tenth Day of November, 2009

David J. Kappos
*Director of the United States Patent and Trademark Office*